United States Patent
Kiontke et al.

(10) Patent No.: US 9,958,657 B2
(45) Date of Patent: May 1, 2018

(54) OPTICAL ELEMENT FOR FOCUSING APPROXIMATELY COLLIMATED RAYS

(71) Applicant: asphericon GmbH, Jena (DE)

(72) Inventors: Sven Kiontke, Jena (DE); Ulrike Fuchs, Jena (DE)

(73) Assignee: Asphericon GmbH, Jena (DE)

( * ) Notice: Subject to any disclaimer, the term of this patent is extended or adjusted under 35 U.S.C. 154(b) by 74 days.

(21) Appl. No.: 15/012,137

(22) Filed: Feb. 1, 2016

(65) Prior Publication Data

US 2016/0223801 A1 Aug. 4, 2016

(30) Foreign Application Priority Data

Jan. 30, 2015 (DE) .................. 10 2015 201 647

(51) Int. Cl.
| | |
|---|---|
| *G02B 5/18* | (2006.01) |
| *G02B 17/08* | (2006.01) |
| *G02B 5/00* | (2006.01) |
| *G02B 27/00* | (2006.01) |
| *G02B 27/09* | (2006.01) |

(52) U.S. Cl.
CPC .......... *G02B 17/086* (2013.01); *G02B 5/001* (2013.01); *G02B 5/1814* (2013.01); *G02B 17/0808* (2013.01); *G02B 27/0056* (2013.01); *G02B 27/0983* (2013.01)

(58) Field of Classification Search
CPC .............. G02B 27/4211; G02B 5/1814; G02B 5/1895; G02B 5/1861; G02B 5/18
USPC .................................................. 359/566–576
See application file for complete search history.

(56) References Cited

U.S. PATENT DOCUMENTS

| | | | | |
|---|---|---|---|---|
| 8,982,481 B2* | 3/2015 | Smirnov | ............. | G03F 7/70633 359/730 |
| 9,377,566 B1* | 6/2016 | Martinsen | ............ | G02B 5/0273 |
| 2010/0309566 A1* | 12/2010 | DeWitt | .................. | G02B 5/001 359/729 |
| 2011/0172649 A1* | 7/2011 | Schuele | .................. | A61F 9/008 606/4 |

* cited by examiner

*Primary Examiner* — Bumsuk Won
*Assistant Examiner* — Tamara Y Washington
(74) *Attorney, Agent, or Firm* — Muncy, Geissler, Olds & Lowe, P.C.

(57) ABSTRACT

A one-piece optical element for focusing an input bundle of collimated rays around an optical axis in a focal region around a focal point. The optical element is bounded on the entry side by a truncated cone centered relative to the optical axis with a top surface pointing toward the light entry and bounded on the exit side by a cone with a cone tip pointing toward the light exit on the optical axis and a rotationally symmetric aspheric boundary surface arranged around the cone. The cone is formed as a complementary cone to the truncated cone. The aspheric boundary surface is formed as a partial surface of the convex surface of a plano-convex aspheric converging lens with a focal point located behind the light exit of the optical element on the optical axis. The lateral surfaces of the truncated cone and of the cone are formed reflecting inwardly and spaced apart along the optical axis so that the approximately collimated input bundle is directed from the inner side of the lateral surface of the cone to the inner side of the lateral surface of the truncated cone.

16 Claims, 2 Drawing Sheets

OPTICAL ELEMENT FOR FOCUSING APPROXIMATELY COLLIMATED RAYS

This nonprovisional application claims priority under 35 U.S.C. § 119(a) to German Patent Application No. 10 2015 201 647.1, which was filed in Germany on Jan. 30, 2015, and which is herein incorporated by reference.

BACKGROUND OF THE INVENTION

Field of the Invention

The invention relates to a one-piece optical element for focusing approximately collimated rays.

Description of the Background Art

Optical elements for ray focusing, which diffract collimated input rays around an optical axis into output rays, which overlap in a focal region, are known from the state of the art. It is possible thereby to change a relatively low average input irradiance, distributed over a relatively broad entrance pupil, into a relatively higher average output irradiance, concentrated in a relatively narrow cross section of the focal region.

The document US 2010/0309566 A1 describes an optical system with at least two reflaxicons made of a solid, light-transmitting material. Each reflaxicon has an inner cone-shaped surface and an outer truncated-cone-shaped surface, which are formed centered to one another along an optical axis and reflective.

Known from the prior art is the use of such optical elements for ray focusing in order to exceed a minimum irradiance only within the focal region, above which certain physical effects such as polymerization, optical perforation, or melting of solid materials are initiated. Thus, it is possible to work on materials or biological tissue in a spatial section, relatively sharply delineated by the focal region.

Optical elements with which an input bundle of rays having a predetermined cross section can be focused on an especially narrow focal region are advantageous both to achieve especially high irradiances and for especially precise treatment. For example, aspheric lenses are known for this purpose from the prior art; based on the laws of geometrical optics, said lenses can be formed so that any input rays, running parallel to the optical axis, for light of one wavelength can be diffracted into output rays, which intersect in a focal point, located at the distance of the focal length from the exit side principal plane of the aspheric lens on the optical axis.

With consideration of wave optical effects, however, no focal point of infinitesimally small extension can be achieved with aspheric lenses of this type as well and also for monochromatic light, but only a focal region of finite extension, which typically is given by the diameter of the Airy disk $$d_{Airy} = 1.22 \cdot \frac{\lambda}{n \cdot \sin(\alpha)},$$

where $\lambda$ is the wavelength of the monochromatic light, n is the refractive index of the medium surrounding the lens, and $\alpha$ is half of the exit side aperture angle of the aspheric lens.

The systems and methods according to the prior art reduce the extent of the focal region by increasing the numerical aperture. When the cross section of the entrance pupil remains the same, an increase in the numerical aperture can be brought about according to the prior art by reducing the focal length, and therefore also by reducing the working distance between the front surface of the lens and the material to be treated. According to the prior art, an increase in the numerical aperture can also be brought about by the use of an immersion liquid between the lens and the material to be treated, which liquid has a higher refractive index than air.

SUMMARY OF THE INVENTION

It is therefore an object of the invention to provide an optical element for focusing approximately collimated light, distributed over an entrance pupil of predetermined diameter, with which element a narrower focal region and/or a greater working distance and/or better movability relative to a material to be treated can be achieved than with systems according to the prior art and which has a compact, space-saving design, and with which adjustment after fabrication of the optical element is eliminated or simplified. The object of the invention is in addition to provide a method for the use of such an optical element and a system for carrying out such a method.

A one-piece optical element for focusing an input bundle of approximately collimated rays around an optical axis in a focal region, according to an exemplary embodiment, is bounded on the entry side by a truncated cone, centered relative to the optical axis, with a top surface pointing toward the light entry, and on the exit side by a cone with a cone tip, pointing toward the light exit, on the optical axis, around which a rotationally symmetric aspheric boundary surface is arranged. The cone is formed as a complementary cone to the truncated cone. The aspheric boundary surface is formed as a partial surface of the convex surface of a plano-convex aspheric converging lens with a focal point, located behind the light exit of the optical element, on the optical axis. The optical element is made of an optically transmissive material. The lateral surfaces of the truncated cone and of the cone are formed reflecting inwardly and spaced apart along the optical axis so that the approximately collimated input bundle is directed from the inner side of the lateral surface of the cone to the inner side of the lateral surface of the truncated cone.

The reflecting lateral surfaces of the truncated cone and cone reshapes an input bundle of light rays, which are approximately collimated to the optical axis and have an irradiance distributed in a Gaussian shape rotationally symmetrically around said optical axis, into a bundle of light rays approximately parallel to the optical axis, which bundle strikes the aspheric boundary surface in the shape of a ring. The aspheric boundary surface focuses this ring-shaped bundle of light rays in a focal region which lies around the focal point of the plano-convex aspheric converging lens, assigned to the aspheric boundary surface. In this case, the irradiance in the focal plane, which contains the focal point and through which the optical axis passes at the focal point, is distributed rotationally symmetrically to the focal point.

An advantage of the optical element of the invention is that the irradiance distribution is distributed more narrowly around the focal point than in systems of optical elements according to the prior art. The effect region in which the irradiance distribution in the focal plane exceeds a certain predefined minimum irradiance, is formed as a circular area with a smaller diameter than is possible with systems according to the prior art. As a result, a higher accuracy can be achieved in applications that depend on a physical effect, which occurs substantially only above such a minimum irradiance. Alternatively, it is also possible to generate a higher irradiance within an effect region, which can also be achieved with systems according to the prior art. As a result, a minimum irradiance for physical effects can be achieved, which could not be achieved or achieved only insufficiently with systems known thus far.

A further advantage of the one-piece optical element of the invention is its compact, space-saving design. With the folding of the ray path caused by the reflection on the lateral surfaces of the cone and truncated cone, an especially small structural length along the optical axis can be achieved. Because the position of the reflecting and refractive boundary surfaces can be predetermined by the design of the one-piece optical element, adjustment after fabrication advantageously becomes unnecessary.

In an embodiment of the one-piece optical element, the lateral surfaces of the truncated cone and of the cone are mirrored inwardly. Such a mirroring can be carried out cost-effectively and advantageously by known methods.

In an embodiment of the one-piece optical element, the opening angle of the cone is smaller than an angle of 180 degrees, reduced by double the limiting angle of the total reflection for a transition from the material of the optical element to air. A total reflection of the light rays collimated approximately to the optical axis and striking the inner side of the lateral surface of the cone can be brought about by the thus selected opening angle of the cone. A total reflection of light rays directed from the inner side of the lateral surface of the cone to the inner side of the lateral surface of the truncated cone is brought about in a similar way. A ray deflection with a lower light loss than on a mirrored boundary surface can be achieved by means of the total reflection. An especially high light yield in the focal region is therefore achieved advantageously in this embodiment of the invention.

In an embodiment of the one-piece optical element, a diffractive optical element is located on the top surface of the truncated cone. The transmission function of said diffractive optical element is selected so that the group velocity dispersion of an ultrashort laser pulse along the ray path through the optical element is approximately minimized. Optionally the transmission function of said diffractive optical element is selected, moreover, so that higher-order dispersions are minimized for such an ultrashort laser pulse. The temporal length and/or the distortion of the pulse shape of such an ultrashort laser pulse in the focal region of the optical element is advantageously limited or minimized thereby.

In a method for focusing an approximately collimated input bundle with a one-piece optical element, an irradiance above a minimum irradiance can be achieved within the focal region for a physical effect, whereby said physical effect fails to appear nearly completely at an irradiance below the irradiance limit. It is therefore possible advantageously to achieve this physical effect within an effect region with an approximately circular cross section and an especially small diameter in comparison with the prior art method. Processing methods with an especially high accuracy and/or resolution are possible thereby.

It is possible, for example, that the effect is based on a polymerization, which occurs nearly completely at or above an irradiance limit and is nearly absent below said irradiance limit. Such so-called 3D printing methods, based on radiation-induced polymerization, can therefore be carried out with an especially high resolution advantageously by means of an optical element of the invention.

In an embodiment of the method, it is possible to trigger an optical perforation above an irradiance limit in an especially small and especially accurately limited region in a treated material. For example, methods, known from the prior art, for laser-induced cavitation, for example, for separating corneal tissue or lens tissue in a laser in-situ keratomileusis (LASIK) operation by means of ultrashort laser pulses can be carried out especially accurately and gently thereby. However, many other methods, known from the prior art, for laser surgery can also be performed with improved accuracy and resolution.

In an embodiment of the method, a solid material is melted above an irradiance limit. For example, methods, known from the prior art, of laser welding or laser cutting are possible especially accurately and/or with especially narrow welding seams or joints.

In a system for carrying out a method for focusing an approximately collimated ray bundle with an optical element of the invention, the optical element is illuminated with approximately collimated light on the entry side. Available cost-effective and high-performance laser sources can be used advantageously for this purpose.

In one embodiment of such a system, the optical element is connected on the exit side to the focal region by an immersion liquid with a refractive index above 1, which causes an increase in the numerical aperture of the optical element. As a result, with an unchanged geometry and irradiance of the entry-side illumination of the optical element, a narrowing of the focal region and thereby an increased irradiance in the focal plane and/or a reduced cross section of the effect region are achieved. It is likewise possible with an unchanged focal region to increase the cross section of the input bundle of light rays and thereby to couple a higher light energy into the optical element and consequently to achieve a higher irradiance in the focal plane. It is possible, furthermore, with an unchanged focal region and an unchanged cross section of the input bundle to reduce the extension of the optical element perpendicular to the optical axis and thus to use an optical element that is more cost-effective and simpler to produce.

In an embodiment of such a system, an optically transmissive protective element is disposed between the optical element of the invention and the focal region; the protective element advantageously prevents the soiling of or mechanical damage to the optical element, particularly the exit-side lateral surface of the cone and the exit-side aspheric boundary surface. For example, such a protective element can prevent or reduce the deposition of evaporated or sprayed material on the exit-side surfaces of the optical element during laser welding or laser cutting.

The protective element can be exchanged in a further version of this embodiment of the invention. In especially dirt-intensive machining methods, a soiled protective element can therefore be replaced with little effort advantageously by a new or cleaned protective element or be removed for cleaning. As a result, machining with a substantially lastingly undiminished irradiance and at the same time a reduced setup time or maintenance period can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
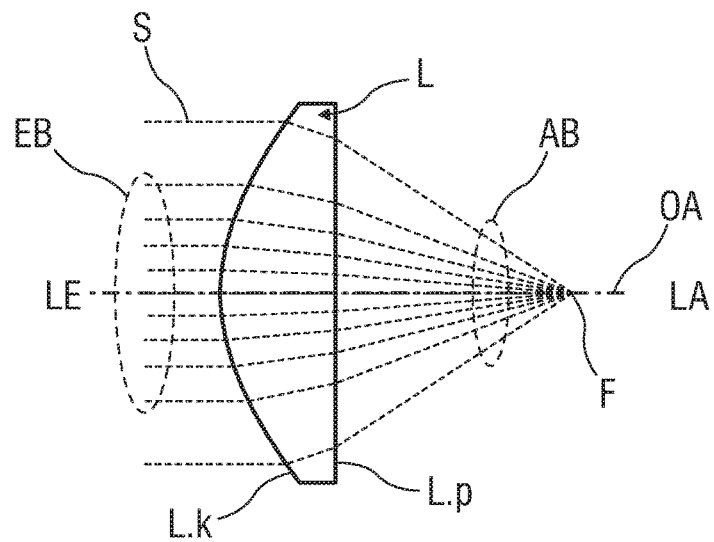
FIG. 1 shows schematically the ray path through a plano-convex aspheric lens.

FIG. 1 shows schematically the path of light rays S through a plano-convex aspheric lens L with an optical axis OA according to the prior art. An input bundle EB of incoming rays, collimated to optical axis OA, at light entry LE enters the plano-convex aspheric lens L at the convex surface thereof L.k. An output bundle AB of convergent outgoing rays exits again at light exit LA on planar surface L.p of plano-convex aspheric lens L. Convex surface L.k is formed rotationally symmetric to optical axis OA so that according to the laws of geometrical optics the outgoing rays would intersect in a focus or focal point F located on the exit side of plano-convex aspheric lens L.

The diffraction to be considered because of the wave nature of light, however, has the effect that contrary to the laws of geometrical optics the entire radiant flux, distributed over all incoming light rays S, is not concentrated at focal point F, but rather is distributed rotationally symmetric to optical axis OA in a focal plane, whereby the focal plane is the plane that contains focal point F and is intersected perpendicularly by optical axis OA at said point.

Figure 2:
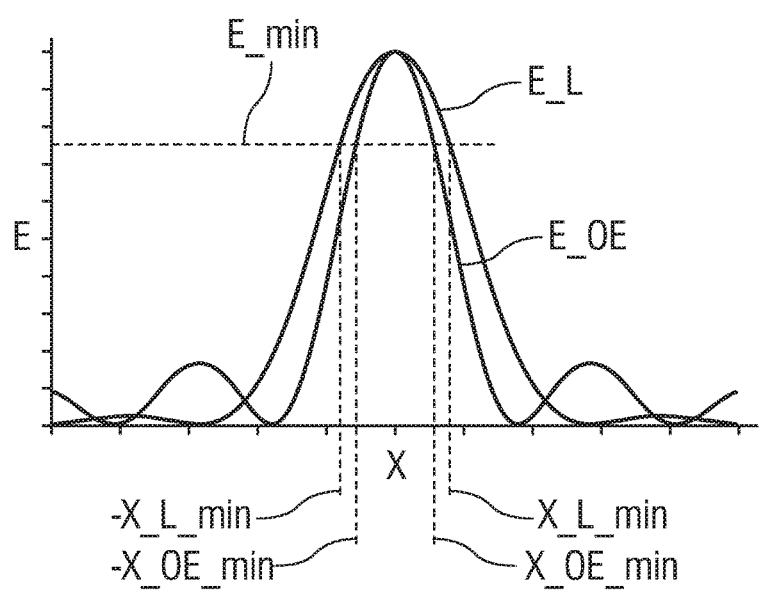
FIG. 2 shows schematically the profile of the irradiance through a focal region along the distance from the optical axis.

FIG. 2 shows schematically the distribution of the irradiance in the focal plane along any imaginary line through focal point F as an irradiance profile, whereby the distance of a position x to focal point F is plotted on the position axis X and the value of the irradiance, measured at said distance x, is plotted on the irradiance axis E. Positions located at the same distance but in the opposite direction from focal point F along the imaginary line through focal point F have opposite signs.

If a plano-convex aspheric lens L is illuminated with an input bundle EB of collimated rays S, as shown schematically in FIG. 1, and if said input bundle EB has a Gaussian irradiance distribution rotationally symmetric around optical axis OA, thus an irradiance distribution rotationally symmetric around optical axis OA and an irradiance profile E_L with a maximum at position x=0, therefore at the location of focal point F, which is surrounded by two zero points, result in the focal plane. A mirror-symmetrical course of irradiance profile E_L relative to the perpendicular line through the position x=0 follows from the rotational symmetry of the irradiance distribution relative to optical axis OA.

If a specific minimum irradiance E_min is needed to achieve a specific physical effect, for example, a polymerization, an optical perforation, or melting of a material, thus this physical effect is achieved in the focal plane only within an effect circle around optical axis OA whose radius is given by the distance value x_L_min, at which minimum irradiance E_min is just achieved by irradiance profile E_L.

The position of the two zero points, surrounding the maximum at focal point F, of irradiance profile E_L is determined by the numerical aperture of the plano-convex aspheric lens L. An increase in the numerical aperture causes these zero points to move closer and, therefore, because the entire radiation power as an area below irradiance profile E_L remains unchanged, also brings about a greater maximum and a steeper decline around this maximum. Systems and methods according to the prior art therefore attempt to increase the numerical aperture of the plano-convex aspheric lens L in order to attain a higher minimum irradiance E_min for achieving a physical effect and/or for improving the accuracy when a physical effect is being achieved.

Figure 3:
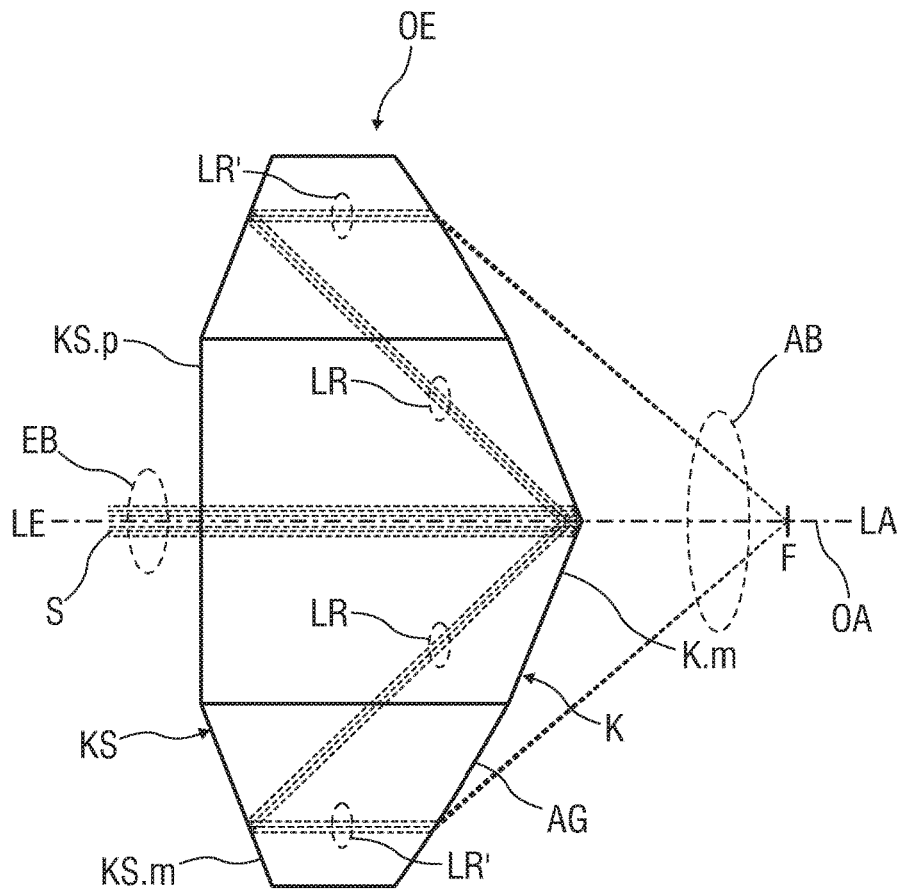
FIG. 3 shows schematically the ray path through a one-piece optical element for ray focusing.

FIG. 3 shows schematically the ray path through a one-piece optical element OE, which is formed rotationally symmetric to an optical axis OA. On the entry side ES, optical element OE is delimited by a truncated cone KS, which has a conical lateral surface KS.m, which runs to a planar top surface KS.p. The conical lateral surface KS.m is mirrored inwardly, so that a light ray S, striking the conical lateral surface KS.m from the interior of optical element OE, is reflected. The planar top surface KS.p points in the direction of the entry side ES and is oriented centered and perpendicular to optical axis OA. The planar top surface KS.p represents the entry port of optical element OE.

On the exit side AS, optical element OE is delimited by a central cone K, whose cone tip lies on optical axis OA and points in the direction of exit side AS. Cone K is formed as a complementary cone to truncated cone KS; in other words: cone K completes truncated cone KS to form a complete cone K. Lateral surface K.m of cone K is mirrored inwardly, so that a light ray S, striking lateral surface K.m from the interior of optical element OE, is reflected.

As an alternative to the mirroring of lateral surfaces K.m, KS.m of cone K and of truncated cone KS, it is possible that depending on the refractive index of the material for optical element OE an opening angle for cone K, and therefore for truncated cone KS as well, is selected so that the reflection of a light ray S on the inner side of lateral surface K.m of cone K and also on the inner side of lateral surface KS.m of truncated cone KS occurs via total reflection.

On exit side AS, optical element OE is delimited further by an aspheric boundary surface AG, which is rotationally symmetric to optical axis OA and borders cone K and encloses it. In the area of aspheric boundary surface AG, therefore outside cone K, the exit-side boundary surface of optical element OE coincides with the convex area L.k of an imaginary plano-convex aspheric lens L, whose focal point on the exit side lies on optical axis OA.

It is possible that the planar top surface KS.p and/or the aspheric boundary surface AG are made anti-reflective in order to limit transmission losses during the entry and/or exit of light into and/or out of optical element OE.

The ray path through optical element OE will be explained below. An input bundle EB of rays S, collimated to optical axis OA, with a circular cross section penetrates planar top surface KS.p without a change in direction and is reflected inwardly on lateral surface K.m of cone K. Because of the incline of lateral surface K.m to optical axis OA, the ray bundle after the reflection on lateral surface K.m has a ring-shaped cross section concentric to optical axis, whereby the inner and outer diameter of light ring LR with this ring-shaped cross section widens uniformly in the direction of the ray path, therefore, in the direction to lateral surface KS.m of truncated cone KS.

The widened light ring LR strikes the inner side of lateral surface KS.m of truncated cone KS at the same angle of incidence at which collimated rays S, parallel to optical axis OA, strike the inner side of lateral surface K.m of truncated cone K, because cone K forms a complementary cone to truncated cone KS. Consequently, the widened light ring LR is reflected on the inner side of lateral surface K.m in a bundle of light rays S, collimated to the optical axis, with a ring-shaped cross section in the direction of the aspheric boundary surface AG. Said reflected light ring LR' with an unchanged ring-shaped cross section therefore strikes aspheric boundary surface AG.

The aspheric boundary surface AG is curved rotationally symmetrically, so that according to the laws of geometrical optics incident rays S, collimated to optical axis OA, would strike an exit-side focal point F.

In fact, the result here as well, because of the bending of the light, is a distribution of the irradiance in the focal plane, which is not concentrated in an infinitesimally small focal point F but reaches beyond it in a rotationally symmetrically manner. FIG. 2 schematically represents the irradiance profile E_OE achieved with optical element OE of the invention, next to the irradiance profile E_L for a plain plano-convex aspheric lens L according to the prior art without use of axicons A1, A2 for beam expansion, whereby both systems have the same numerical aperture.

As is evident from FIG. 2, the central maximum, therefore the region between the two minima or zero points enclosing the maximum, of the irradiance profile E_OE, achieved with optical element OE, is narrower than the central maximum of the irradiance profile E_L according to the prior art. In particular, the region, in which the predefined minimum irradiance E_min is exceeded, with a ray formed by optical element OE is also narrower and corresponds to a circle around optical axis OA, whereby the radius of the circle is given by the distance value x_SF_min at which minimum irradiance E_min is just achieved by irradiation profile E_OE.

Therefore, a more accurate processing of a workpiece or a material can occur in an advantageous manner with optical element OE, when this processing is based on a physical effect that is triggered only above such a predefined minimum irradiance E_min, without the numerical aperture with the negative effects known from the prior art having to be increased for this purpose.

It is apparent to the skilled artisan that an irradiance profile that is basically similar to the shown course of irradiance profile E_OE, particularly with respect to the height and width of the central maximum, results for an input bundle EB, comprising not solely precisely collimated rays S, but slightly divergent or convergent, therefore generally slightly inclined rays S, for example, by less than 5 degrees, relative to optical axis OA. Therefore, optical element OE can also be used advantageously for light sources that are not precisely collimated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A one-piece optical element made of an optically transparent material for focusing an input bundle of collimated rays around an optical axis in a focal region around a focal point bounded on an entry side by a truncated cone centered relative to the optical axis with a top surface pointing toward a light entry and bounded on an exit side by a cone with a cone tip pointing toward the light exit on the optical axis and an aspheric boundary surface arranged rotationally symmetrically around the cone, wherein the cone is formed as a complementary cone to the truncated cone,
wherein the aspheric boundary surface is formed as a partial surface of the convex surface of a plano-convex aspheric converging lens with a focal point located behind the light exit of the optical element on the optical axis, and
wherein the lateral surfaces of the truncated cone and of the cone are spaced apart inwardly reflecting and along the optical axis so that the collimated input bundle is directed from the inner side of the lateral surface of the cone to the inner side of the lateral surface of the truncated cone.

2. The one-piece optical element according to claim 1, wherein the lateral surfaces of the truncated cone and of the cone are mirrored inwardly.

3. The one-piece optical element according to claim 1, wherein the opening angle of the cone is smaller than an angle of 180 degrees, reduced by double the limiting angle of the total reflection for a transition from the optically transmissive material of the optical element to air.

4. The one-piece optical element according to claim 1, wherein a diffractive optical element, whose transmission function is selected so that the group velocity dispersion of an ultrashort laser pulse along the ray path through the optical element is minimized, is located on the top surface of the truncated cone.

5. The one-piece optical element according to claim 4, wherein the transmission function of the diffractive optical element is selected so that the group velocity dispersion and higher-order dispersions of an ultrashort laser pulse along the ray path through the optical element are minimized.

6. A method for focusing an input bundle of collimated rays with a one-piece optical element according to claim 1, wherein an irradiance above a minimum irradiance is achieved within the focal region around the focal point for a physical effect that is completely absent outside the focal region.

7. The method according to claim 6, wherein the physical effect is based on a polymerization above the minimum irradiance.

8. The method according to claim 6, wherein the physical effect is based on an optical perforation above the minimum irradiance.

9. The method according to claim 6, wherein the physical effect is based on the melting of a solid material above the minimum irradiance.

10. A system for carrying out a method according to claim 6, wherein the one-piece optical element is illuminated with collimated light on the entry side.

11. The system according to claim 10, wherein the one-piece optical element is connected to the focal region around the focal point by an immersion liquid with a refractive index greater than 1.

12. The system according to claim 10, wherein an optically transmissive protective element is disposed between the one-piece optical element and the focal region.

13. The system according to claim 12, wherein the protective element is exchangable.

14. The optical element of claim 1, wherein the lateral surfaces of the truncated cone mirror the lateral surfaces of the cone about a plane perpendicular to the optical axis.

15. An optical element, comprising:
a single piece, monolithic lens having a entrance face receiving a light beam, a exit face opposite the entrance face, and an optical axis;

wherein a central portion of the exit face forms a cone about the optical axis with a lateral conical surface, wherein the entrance face forms a truncated cone about the optical axis, wherein a central portion of the entrance face directly opposite the central portion of the exit face is planar and perpendicular to the optical axis, wherein the cone is formed as a complementary cone to the truncated cone, wherein the light beam is split by an internal surface of the lateral conical surface of the cone by reflection, the light beam reflecting away from the optical axis towards a peripheral portion of the entrance face, wherein the peripheral portion of the entrance face reflects the split light beam internally to be parallel to the optical axis, the peripheral portion of the entrance face forming a first aspheric boundary surface, wherein the split light beam is then refracted by a peripheral portion of the exit face towards a focal point, the peripheral portion of the exit face being a second aspheric boundary surface.

16. The optical element of claim 15, wherein after the light beam enters the lens, all light paths remain in an optical material of the lens until the split light beam exits at the exit face.

* * * * *